US011871501B2

(12) United States Patent
Lee

(10) Patent No.: US 11,871,501 B2
(45) Date of Patent: Jan. 9, 2024

(54) QUANTUM KINETIC OSCILLATOR

(71) Applicant: McKane B. Lee, Arlington, WA (US)

(72) Inventor: McKane B. Lee, Arlington, WA (US)

( * ) Notice: Subject to any disclaimer, the term of this patent is extended or adjusted under 35 U.S.C. 154(b) by 730 days.

(21) Appl. No.: 17/060,488

(22) Filed: Oct. 1, 2020

(65) Prior Publication Data

US 2021/0095846 A1 Apr. 1, 2021

Related U.S. Application Data

(60) Provisional application No. 62/908,768, filed on Oct. 1, 2019.

(51) Int. Cl.
*F22G 1/16* (2006.01)
*H05B 6/80* (2006.01)
*F22B 1/30* (2006.01)

(52) U.S. Cl.
CPC ............... *H05B 6/804* (2013.01); *F22B 1/30* (2013.01); *F22G 1/165* (2013.01)

(58) Field of Classification Search
CPC .... F22B 1/28; F22B 1/284; F22B 1/30; F22B 35/00; F22G 1/165; H05B 6/804
See application file for complete search history.

(56) References Cited

U.S. PATENT DOCUMENTS

2011/0266272 A1* 11/2011 Colburn .................. H05B 3/60 219/401

FOREIGN PATENT DOCUMENTS

| | | | | | |
|---|---|---|---|---|---|
| CN | 108548165 | A | * | 9/2018 | |
| CN | 209596823 | U | * | 11/2019 | |
| KR | 20150030423 | A | * | 3/2015 | |
| WO | WO-2020204246 | A1 | * | 10/2020 | ................ F22B 1/30 |

* cited by examiner

*Primary Examiner* — Hung D Nguyen

(74) *Attorney, Agent, or Firm* — Emerson, Thomson & Bennett, LLC; Roger D. Emerson

(57) ABSTRACT

An oscillator including a tuned resonating cavity uses an alternating electrostatic unipolar burst of voltage to oscillate water molecules into a superheated state. Particle displacement is achieved by opposite electrical charge potentials as the electromotive force mover upon water molecules. These short oscillations cause elastic and inelastic particle impacting of the bipolar water molecules. The oscillator of the present invention is implemented with a dual-switching transformer which is tuned to resonate with water. Electrodes are formed of an electro-conductive material submerged in/or around the water. Resonant metallic capacitive vessels are made in various shapes and sizes to reach determined thermal radiating electromagnetic levels as they are progressively oscillated during operations.

10 Claims, 18 Drawing Sheets

QUANTUM KINETIC OSCILLATOR

CROSS-REFERENCE TO RELATED APPLICATIONS

This application claims the benefit of U.S. provisional patent application Ser. No. 62/908,768, filed on Oct. 1, 2019, which is incorporated herein by reference.

BACKGROUND OF THE INVENTION

A. Field of Invention

This invention pertains to the field of steam generation, particularly for the purpose of electrical power generation.

B. Description of the Related Art

It is known in the art to provide coal burning, nuclear rods, natural gas, petroleum, solar arrays, geothermal, and microwave technology to boil water in order to create steam, which is used to spin the turbine of an electrical motor to produce electricity. Steam is utilized as the prime mover in all electrical generating power plants in the United States and the rest of the world. Prior art methods of boiling water can be either dangerous, dirty or crude methods for power generation.

SUMMARY OF THE INVENTION

The present invention includes an oscillator including a tuned resonating cavity that uses an alternating electrostatic DC voltage pulse burst to oscillate water molecules into a superheated state. Particle displacement is achieved by opposite electrical charge potential as the electromotive force mover upon water molecules. These short oscillations cause elastic and inelastic particle impacting of the bipolar water molecules.

The oscillator of the present invention is implemented with a dual-switching transformer, (i.e., a Dual-Tri-Coil Transformer or DTCT) which is tuned to resonate with a capacitor's dielectric values. In this particular case the capacitive dielectric medium is water.

The dielectric value of water is 78.54 which behaves as a "water capacitor" in the form of electrical capacitive reactance and resistance or a closed-loop electrical RLC (Resistive, Inductive and Capacitive) circuit. Electrodes are formed of an electro-conductive material submerged in/or around the water, preferably stainless steel T304. Resonant metallic capacitive vessels (or waveguides) can be made in various shapes and sizes to reach determined thermal radiating electromagnetic levels as they are progressively oscillated during operations.

In accordance with the present invention, an oscillator apparatus for producing steam can include a first electrode assembly and a second electrode assembly. The first electrode assembly includes a first tubular electrode having a first polarity and a first cylindrical electrode having a second polarity. The first cylindrical electrode is mounted concentrically within the first tubular electrode along a first longitudinal axis. Similarly, the second electrode assembly includes a second tubular electrode having a first polarity and a second cylindrical electrode having a second polarity. The second cylindrical electrode is mounted concentrically within the second tubular electrode along a second longitudinal axis.

The present oscillator also includes a housing for enclosing the first and second electrode assemblies within a volume of water. One or more exit port holes are formed on each of the first and second tubular electrodes to allow superheated steam to exit the first and second tubular electrodes into an interior chamber enclosed by the housing and then into a boiler. A dual pulsing circuit is electrically connected to the first and second electrode assemblies to produce a series of alternating unipolar voltage pulses between the first and second electrode assemblies in a sequential manner to create a switching electrostatic flux field. The first and second electrode assemblies define a dual resonant cavity that utilizes the switching electrostatic flux field to rapidly oscillate water molecules and thereby produce superheated steam.

In an exemplary embodiment of the present invention, the first and second tubular electrodes are electrically positive "exciter" electrodes and the first and second cylindrical electrodes are electrically negative electrodes. The dual pulsing circuit is preferably configured to produce a series of alternating unipolar positive voltage pulses between the positive "exciter" electrodes of the first and second electrode assemblies. The first and second electrode assemblies can also include terminals for electrically connecting to the dual pulsing circuit. The housing can also include a top cap for enclosing a top of the housing and a base plate for enclosing a bottom of the housing.

The oscillator can also include a water thruster nozzle, mounted in a parallel or series with the housing. The water thruster nozzle can also include a series of aligned electrodes, each for applying an electromotive thrust to charged water molecules from the housing. The electrodes of the water thruster nozzle are all charged with the same electric charge. Moreover, the electrodes of the water thruster nozzle are tapered in a direction of movement of the charged water molecules. The water thruster nozzle and associated electrodes comprise a central channel for receiving a geometrically centered laser beam for inducing plasma channeling in the charged water molecules.

The oscillator can also include a Dual Tri-Coil Transformer (DTCT) linked to the dual pulsing circuit that alternates the unipolar positive voltage pulses from one of the positive electrodes of the first and second electrode assemblies to another.

Other benefits and advantages of the invention will become apparent to those skilled in the art it pertains upon a reading and understanding of the following detailed specification.

BRIEF DESCRIPTION OF THE DRAWINGS

The invention may take physical form in certain parts and arrangement of parts, embodiment of which will be described in detail in this specification and illustrated in the accompanying drawings which form a part hereof and wherein.

DETAILED DESCRIPTION OF THE INVENTION

Figure 1A:
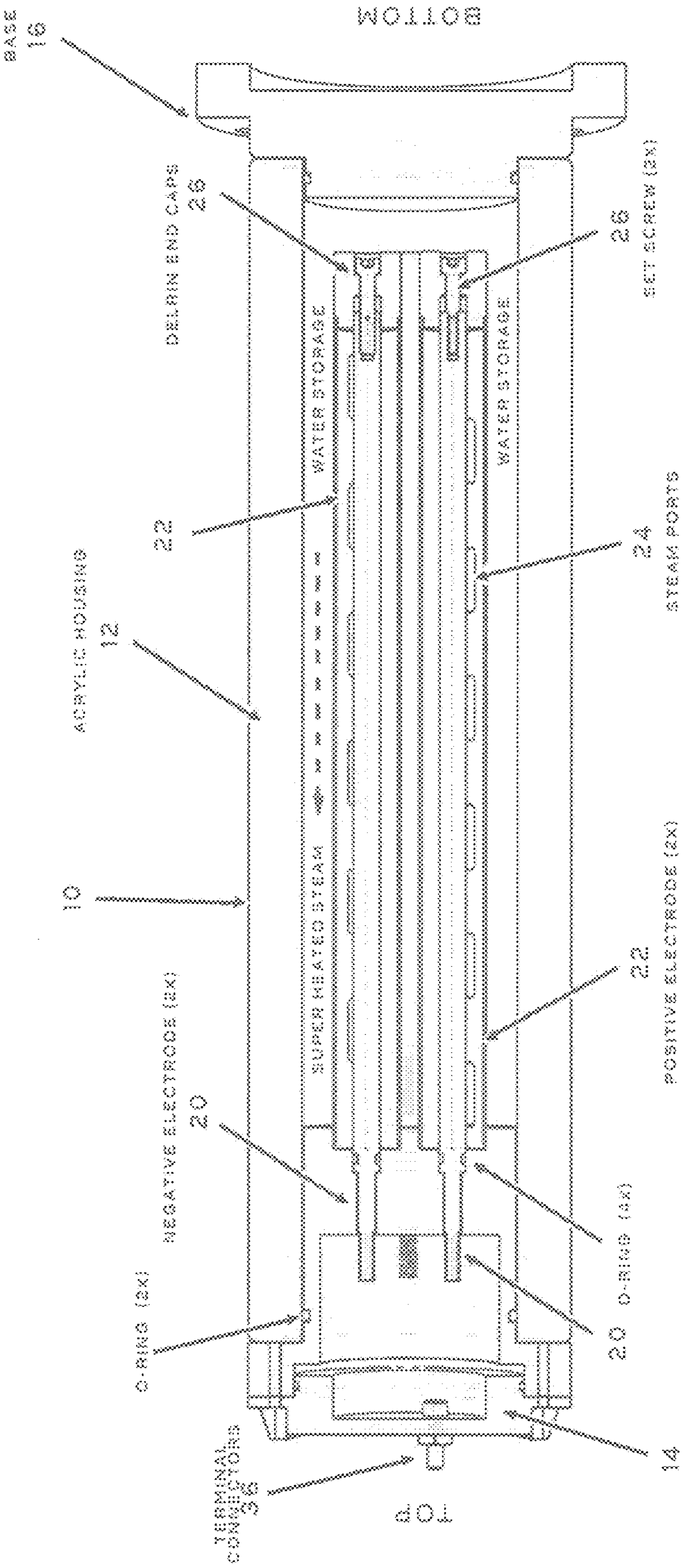
FIGS. 1A, 1B, 1C, and 1D are respective perspective and sectional views of the oscillator apparatus according to the present invention.
Figure 1B:
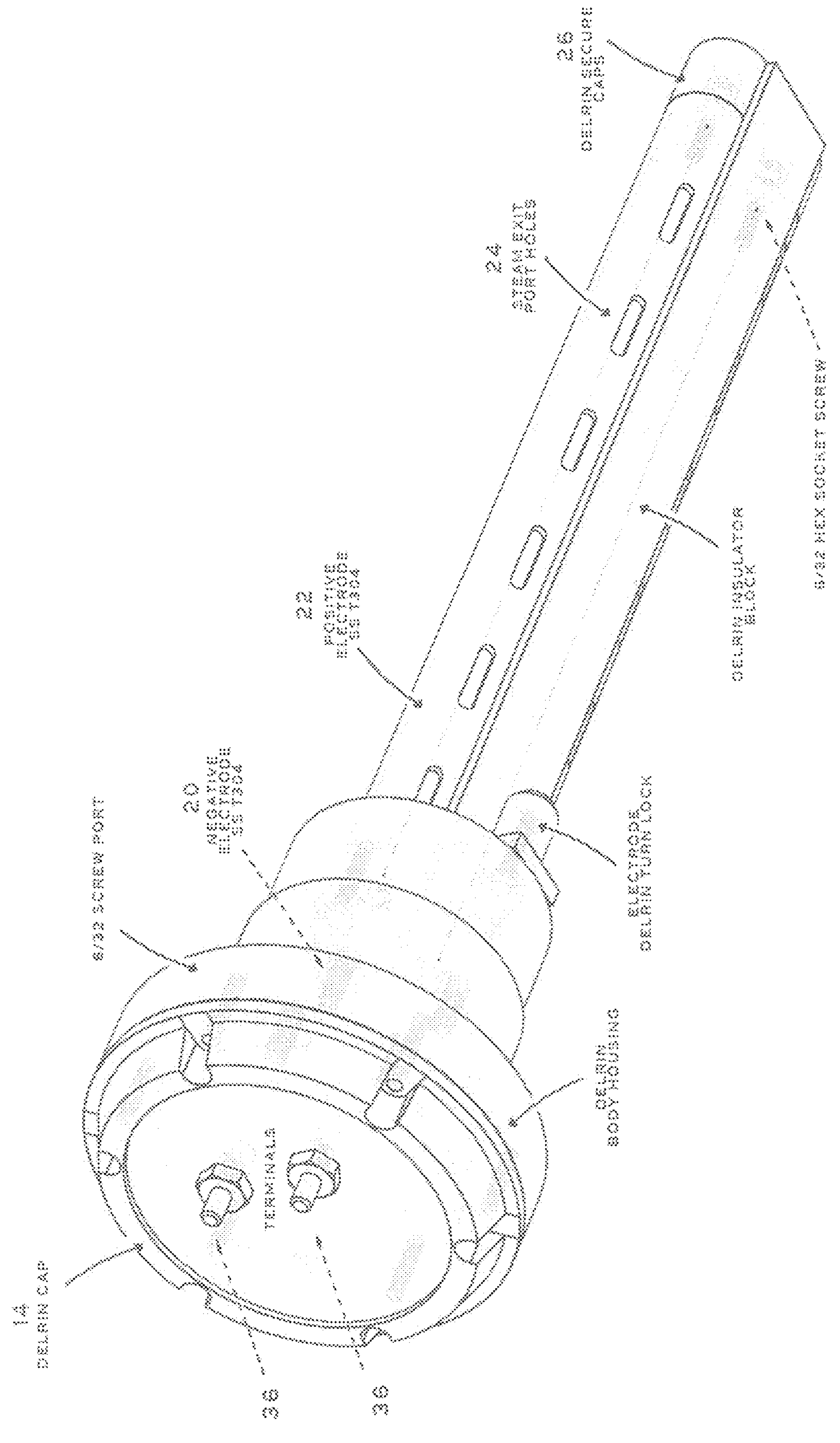
Figure 1C:
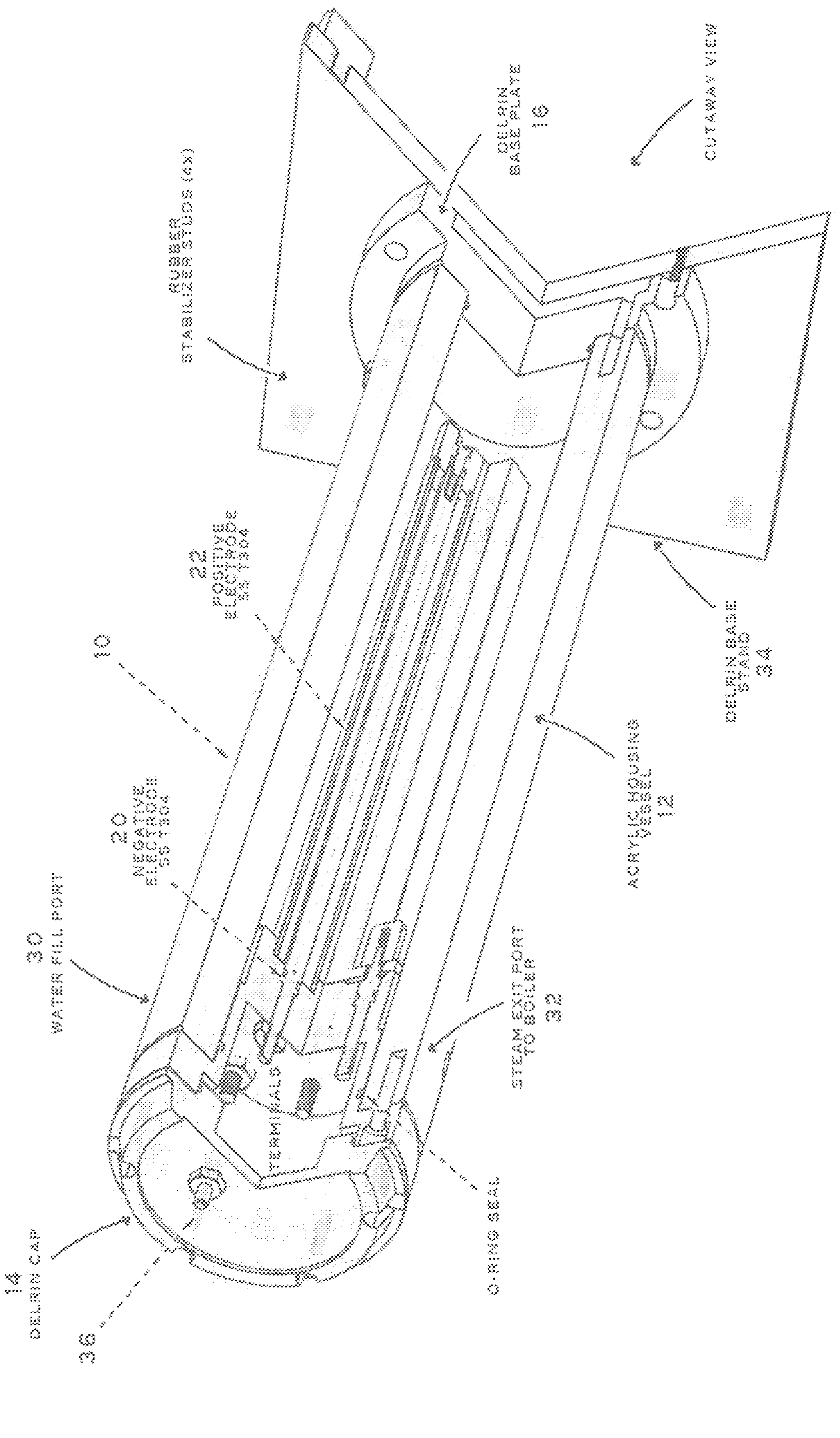

Referring now to the drawings wherein the showings are for purposes of illustrating embodiments of the invention only and not for purposes of limiting the same, FIGS. 1A, 1B, 1C, and 1D are respective perspective and sectional views of the oscillator apparatus 10 according to the present invention. As shown in FIG. 1A, the oscillator 10 includes an acrylic housing 12 that encloses a volume for water storage. The housing 12 is enclosed by a top cap 14 at a top end, where the top cap 14 is preferably formed of Delrin (a trade name for polyoxymethylene, as sold by DuPont). A bottom end of the housing 12 is enclosed by a base plate 16, also formed of Delrin. An exemplary embodiment can include the following dimensions: the top cap 14 is 3 inches in diameter and 2 inches tall; the acrylic housing 14 has an outer diameter of 3 inches, an inner diameter of 2 inches, and is 12 inches tall; and the base plate 16 is 0.625 inches in diameter and 0.7 inches tall.

The housing 12 encloses a pair of electrode assemblies, each including a cylindrical negative electrode 20 (ground), mounted within a tubular positive electrode 22 to thereby form a capacitor. Both the negative electrode 20 and the positive electrode 22 in each of the pair of electrode assemblies are centered along a common longitudinal axis. Each positive electrode 22 includes a plurality of steam exit port holes 24 to allow superheated steam to exit the positive electrode 22 into an interior chamber enclosed by the housing 12 and then into a boiler. Each positive electrode 22 includes an end cap 26 formed of Delrin. The electrodes 20, 22 are "exciters" that define a resonant cavity for creating superheated steam. The housing 12 includes a water fill port 30 and a steam exit port 32. The apparatus 10 is mounted on a base stand 34 for holding the apparatus stable. The electrodes 20, 22 are connected to terminals 36, mounted on the top cap 14.

The two pairs of electrodes 20, 22 define a dual resonant cavity that utilizes the switching electrostatic flux field to rapidly oscillate water molecules. The dual resonant cavities are in parallel formation with respect to each other. In the preferred embodiment, the electrodes are "exciters" formed of stainless steel T304. The electrodes can alternatively be made of any other suitable material that is chemically inert to the voltage deflection process. The two outer electrodes are preferably 7.73 inches long with an OD (outer diameter) of 0.63 inches. The inner electrodes are round stock rods of stainless steel T304, 9 inches in length, with an OD of 0.25 inches, The exciters should be polished and smooth. As will be explained in greater detail hereinbelow, as a result of dual switching pulses, each resonant cavity alternates the electrostatic voltage potentials, which "sloshes" the water molecule back and forth between each pulsed sequence. The water molecules are thus constantly in a state of electromotive push and pull. As the water molecules collide, they will release infrared or heat energy in the form of photons. Increasing voltage input potential increases photon propagation probability.

Figure 3A:
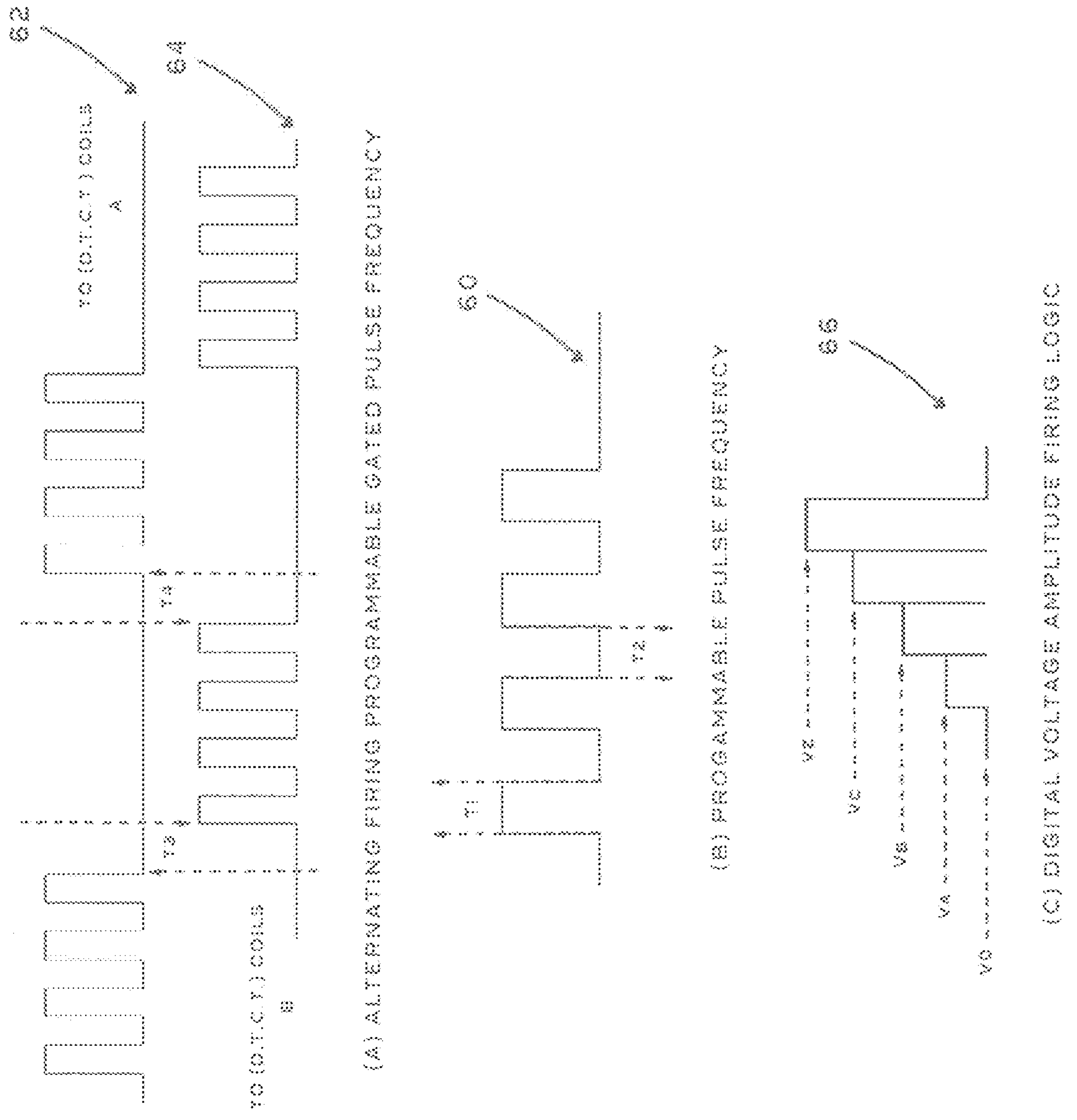
FIGS. 3A, 3B, 3C, 3D, 3E, 3F and 3G respectively depict voltage switchover pulse firing logic, and schematics of a pulsing two-state switching circuit and the DTCT according to the present invention; and apparatus block diagram along with electrical control module i.e. inertial dampener circuit board.

The water thruster nozzle 70 is a resonant cavity with several aligned electrodes housed in an acrylic insulating tube 75. There can be theoretically an infinite number of sequenced electrodes within the cavity (i.e., particle accelerator). However, four or five is sufficient to provide enough electrostatic inertia, that is, enough "push" to the water within the cavity 70. Increasing voltage (V0-VZ) potential 66 establishes larger unilateral thrusting power to the cavity per electrode pulse, as shown in FIG. 3A.

An exemplary embodiment of the water thruster nozzle 70 can include Delrin caps, 2.5 inches in diameter and 1.4 inches tall. A 304L S/S tapered electrode can be 1.49 inches in diameter and having a 0.20 inch diameter tapered exit port. An acrylic housing has an outer diameter of 2.5 inches with an inner diameter of 1.5 inches and 6 inches tall. Acrylic spacers have an outer diameter of 1.48 inches and in inner diameter of 1.10 inches.

Figure 1D:
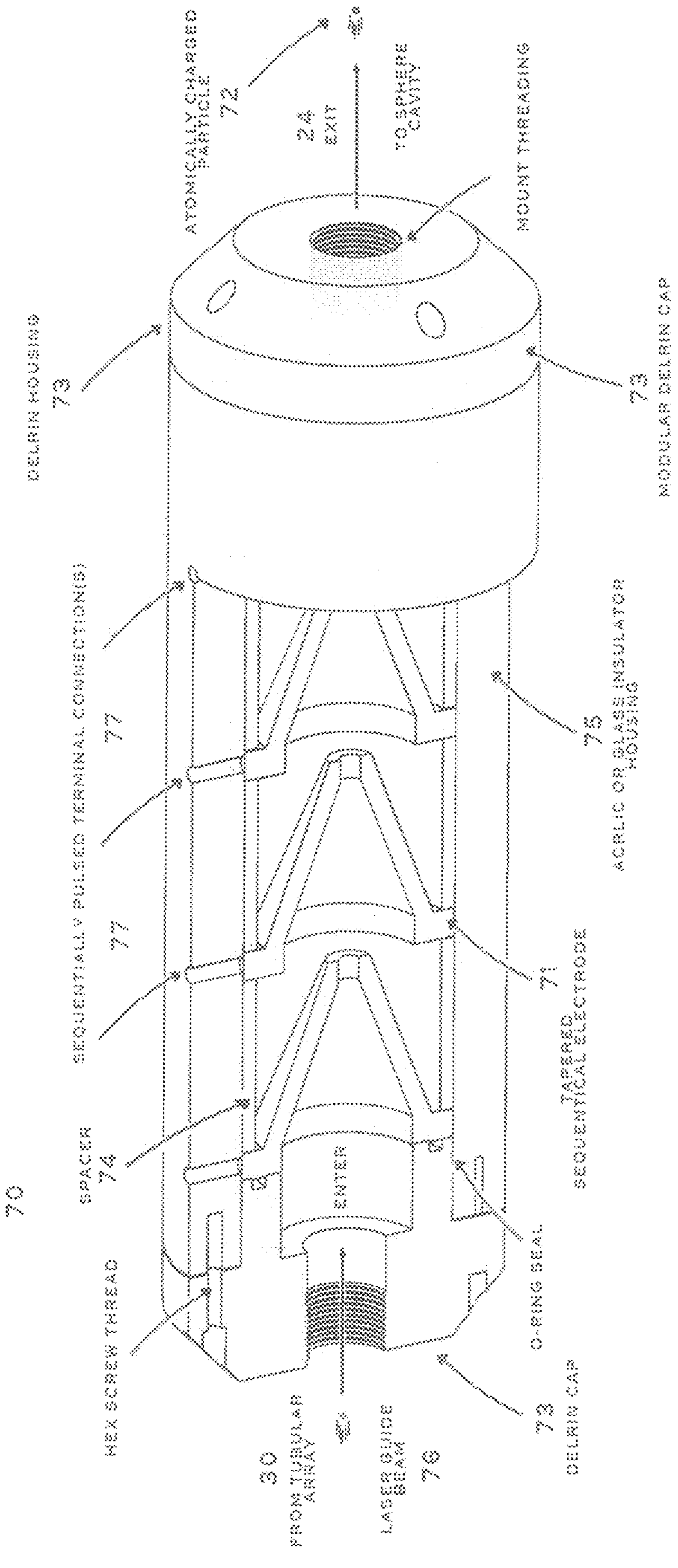

The water thruster nozzle 70 shown in FIG. 1D can be utilized as a sequentially pulsed electrode in a series or parallel arrangement. Unipolar 67 pulses, from FIG. 3C, are aligned and sequential 77 pulsed fire mode as a stepping up or stepping down action. Tapered positive (+) electrode 71 designs allow for more electromotive squeezing upon the charged particles 72 as they leave the electrode nozzles with the resonant cavity 70. Series or paralleled electrodes can be all positively charged or all negatively charged 20 with the cavity. Charged water molecules are either repelled through the nozzle design or electrically pushed (i.e., electrostatic flux) through the device 70 using respectively (B+) positive 22 or (B−) negative 20 electrostatic flux charge potentials (FIG. 4B).

Four electrodes in parallel can operate with two separate DTCT 50 units, in order to implement operational transformer operations. (See FIG. 3F.) Proper spacing of the tapered electrodes is critical to the efficiency of electromotive coherence. Acrylic spacers 74 are sized properly to afford maximum time delay between each sequential pulse burst.

Exiting charged particles 72 from the nozzle are sent to another pulsing network to further the speed of the particle movements. Threaded Delrin caps 73 allow for modular design applications of stacking a plurality of water thruster nozzles 70 together in series or parallel arrangements. These particles can be further excited and thus guided by geometrically centered laser beams within the conical confines of the tapered electrode of the thruster 76. This is "induced plasma channeling" via a photon beam excitement process. Photons innately have inertia associated with their propagation through free space and during reflection/refraction applications to matter. Selecting the proper frequency of laser beam will be apparent to those skilled in the art.

The thruster device design utilizes the oscillator "sloshing" principles, which can push or pull water through a network of systems without any moving parts or motors. With no such moving parts to wear down, the water thruster nozzle 70 allows for long life duration of working operations. The thruster can also be retrofit to a marine vessel with a swiveling armature. No propeller design is necessary in such an application. A voltage difference in potential (V0-VZ) 66 becomes the moving force to an underwater vehicle, which can easily be vectored for any given operation by using voltage. Voltage levels could reach anywhere from 5000 volts to 60,000 volts for larger vessel applications. Interfacing an energized magnetic field coil perpendicular bisector to the "exciters" plasma oscillation amplifies electrostatic pressure to the dielectric mediums.

Figure 2A:
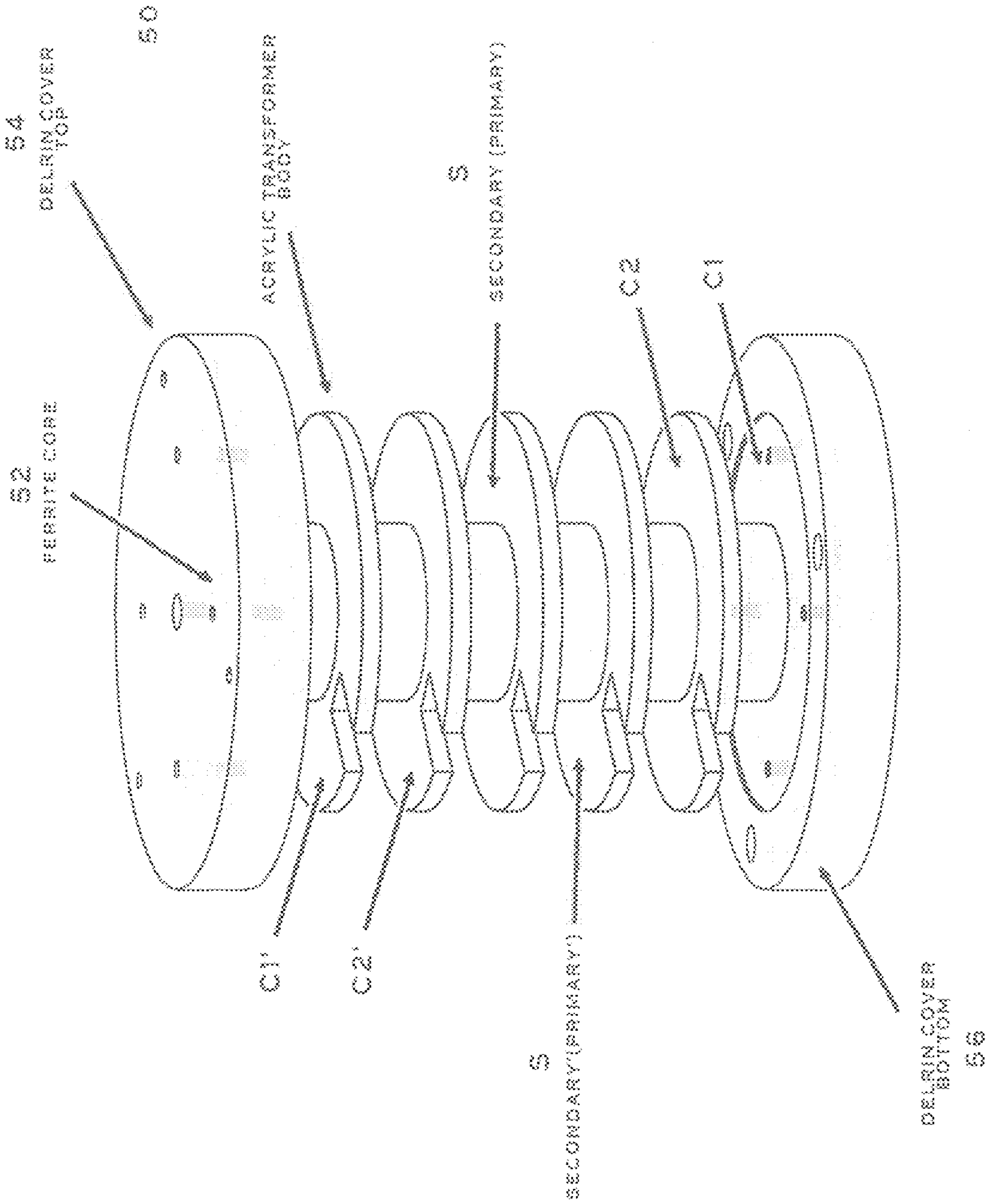
FIGS. 2A and 2B are respective embodiments of the Dual Tri-Coil Transformer (DTCT) according to the present invention.
Figure 2B:
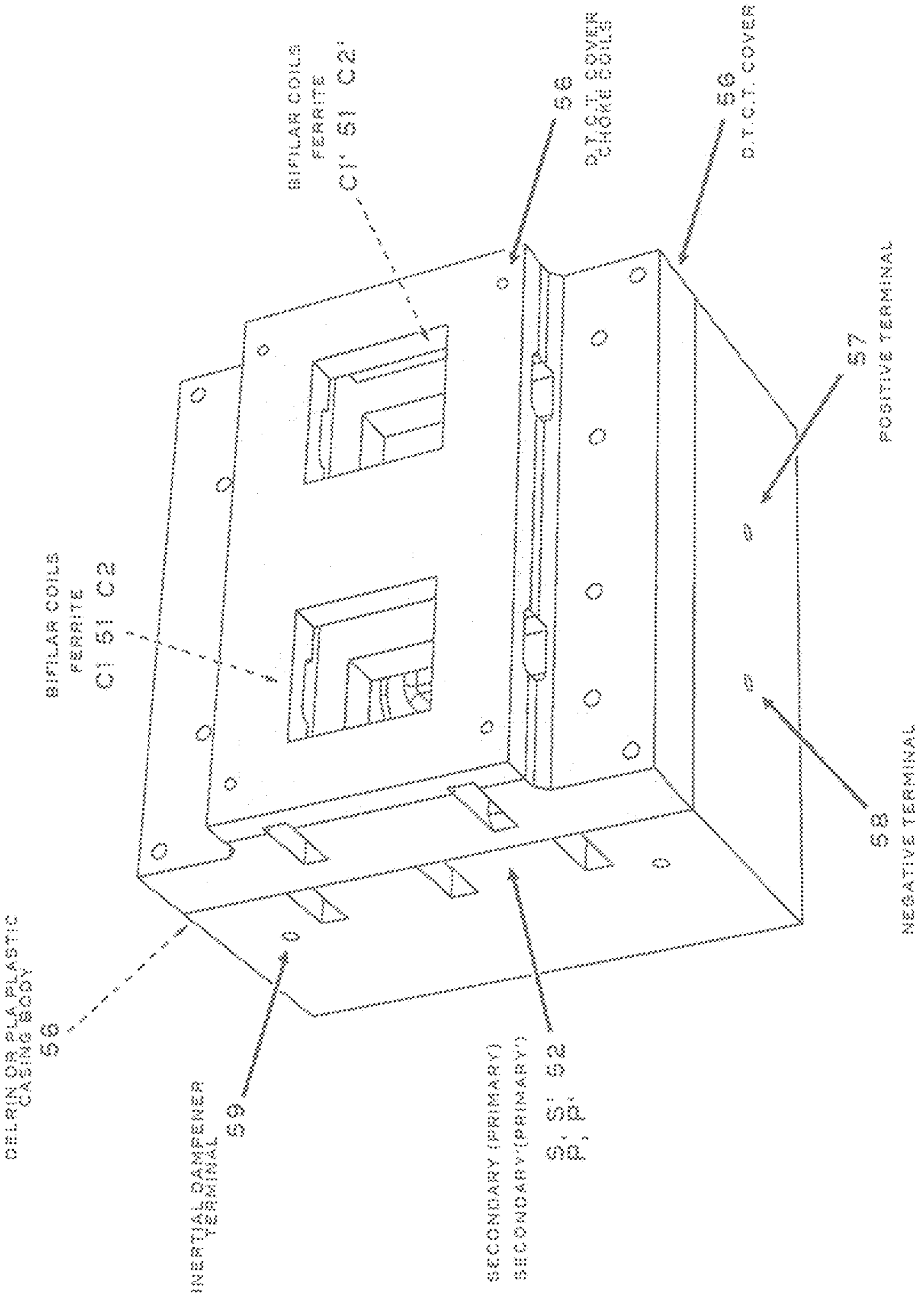

FIGS. 2A and 2B show the Dual Tri-Coil Transformer (DTCT) 50. As especially shown in FIG. 2A, the DTCT 50 is preferably a choke coil for high-pass filtering. The DTCT 50 is formed of a plurality of coils formed of bifilar wire. The coils are in a mirror symmetrical "dual tri-coil" configuration—C1 C2, S, S', C2', C1'—where C1 and C1', C2 and C2', and S and S' respectively are substantially similar coils, so that the order of coils in a first section is the reverse of the order of coils in a second section. S and S' are "secondary" coils that interact with a "primary" inductor, as explained in detail hereinbelow. A ferrite core 52 is retained along a central axis of the DTCT 50. The ferrite core 52 influences and enhances superposition wave propagations within the DTCT 50. Typical ferrite "type 77" materials are used. Typical radio ferrite rods, EC rings and other choke design shapes may alternatively be utilized to provide resonance stability.

The bifilar coil design establishes opposing magnetic field flux fields (N & S to S & N) between the two tri-coils. This establishes an electron blocking, shielding, repulsive action upon the electrons within a closed-loop circuit of the DTCT 50. The coils C1 and C1' of the DTCT 50 operate as an impedance coil while C2 and C2' are frequency bypass filters. The coils C1, C1', C2, C2' are filter coils which allow proper impedance and frequency locking to occur within a closed-loop circuit. This coil configuration arrangement and wiring interfacing of the DTCT 50 can establish "electrical bucking" for increasing electron migration, deflection, and oscillations within the cavity. Using bifilar wire in the coil design establishes harder bucking voltage spikes in both positive and negative voltage potentials.

"Electrical bucking" is defined as counteracting one quantity (such as a current voltage) by opposing it with a like quantity of equal magnitude by opposite polarity. Bifilar coil design allows for this magnetic flux bucking on the electrons through the coil that is connected to the oscillator 10 enhancing voltage perturbations with minimal amp influx. Further, bifilar frequency bypass coil alternations on C1 and C1' along with pulsing C2 and C2' give rise to the magnetic fields to oppose one another, much like a hum-bucking coil of an electrodynamics speaker.

The DTCT 50 can be seen as a "closed-loop" design just the same as the autotransformer which is either a step-down or step-up transformer depending on the coil wraps. A voltage, current or impedance transforming device in which parts of one winding are common to both the primary and secondary shown in FIG. 3C. The pulse network to the DTCT 50 should not drop below the artificial ground 67.

Maximum voltage potentials are determined by the coil wrap turn counts of S and S' where the greater the turn counts, the larger the voltage potential on the capacitive plates. The turn count of C1 and C1' can also be increased to further stimulate the atomic excitation. Coil wrap designs are not limited to single wrap designs. Efficiency levels for electron deflection within the RLC circuit and within the resonant cavity are achievable with other choke coil designs.

The DTCT 50 is linked to a dual pulsing circuit (discussed hereinbelow) that switches or alternates a unipolar positive voltage pulse from one "exciter" electrode 20, 22 to another in a sequential manner to produce superheated steam by way of voltage deflection of the water molecule. Electrical shielding such as thin copper, stainless or wire braid plating can be placed around the 50 to protect the pulsing coils from outside interfering electromagnetic interferences (i.e., cell towers, microwaves, etc.).

The DTCT "box" design shown in FIG. 2B is encased in an electrically insulating material such as 3D printed PLA (polylactide) or milled with plastic Delrin. For low resonant frequency utilization, the box designed DTCT 50 has two bifilar coils C1, C1' and C2, C2', which are formed of 19 awg magnetic wire wrapped around EC ferrite cores 51. In an exemplary embodiment, the ferrite cores can be DigiKey part number 0P45224EC (Magnetics Catalog) MFG #EC52/24/14-3C94. Secondary coils S, S' along with primary coils P1, P1' are wrapped in pairing arrangement around a ferrite core 52 (which can be of the type 0P48020EC (Magnetics Catalog) or MTL Distribution). Voltage intensity is determined by secondary turn counts with the box design DTCT.

Primary transformers P1, P1' can be grounded, as indicated in FIG. 3C. Those skilled in the art can achieve electrical resonance with the DTCT of a closed loop system. This closed loop design is analogous to an autotransformer application. A positive terminal 57 and a negative terminal 58 are connected to the insulated outside of the box DTCT 50, 56. Alternating unipolar burst pulses are established through a pulsing phototransistor network shown in FIG. 3B and 3D, which ultimately drive the oscillator and the DTCT as one harmonically tuned device.

An inertial dampener system 59 may be attached to the plastic enclosure 56 of the DTCT. (See FIG. 3G.) The purpose of the inertial dampener circuit (shown in FIGS. 3D and 3G) is to establish ionic fluctuation controllability within the DTCT. As explained hereinabove, ionic flow establishes wave energy within the RLC closed-loop circuit. This may not be desirable due to electrostatic flux bleeding on the capacitive plates 22, 23. Thus, a transistor (either PNP or NPN) is attached into the coils of the DTCT 50 to synch the gating ON and OFF pulses to the terminals 36.

Figure 3B:
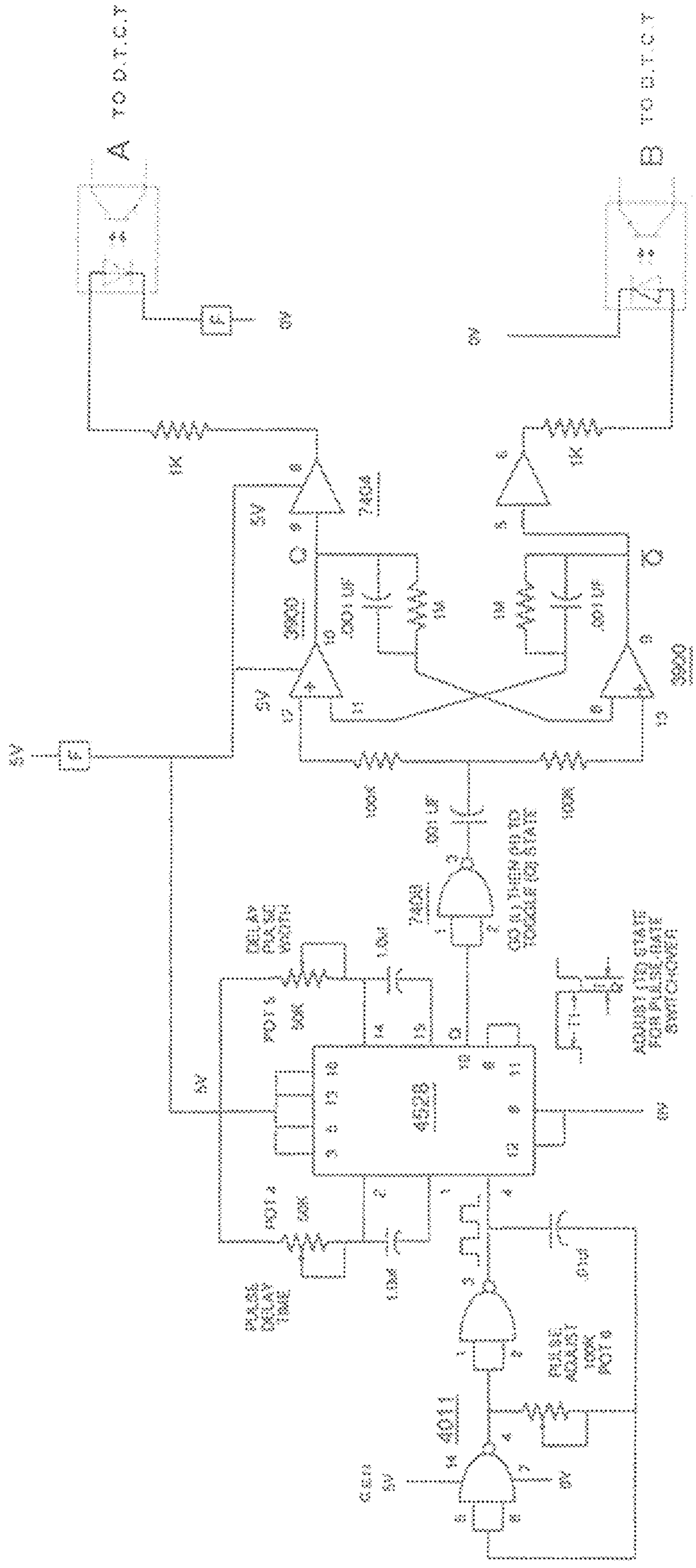
Figure 3C:
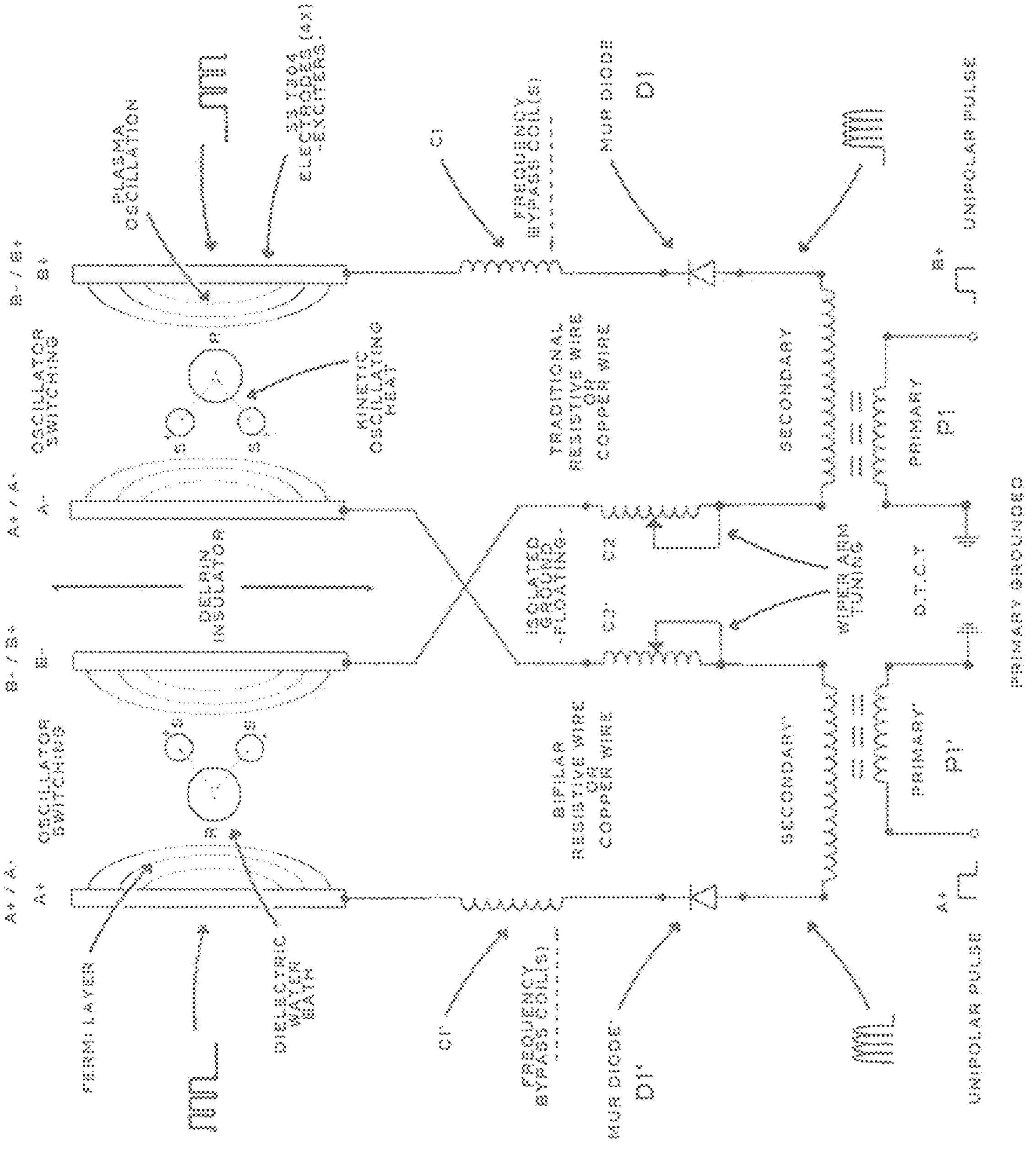
Figure 3D:
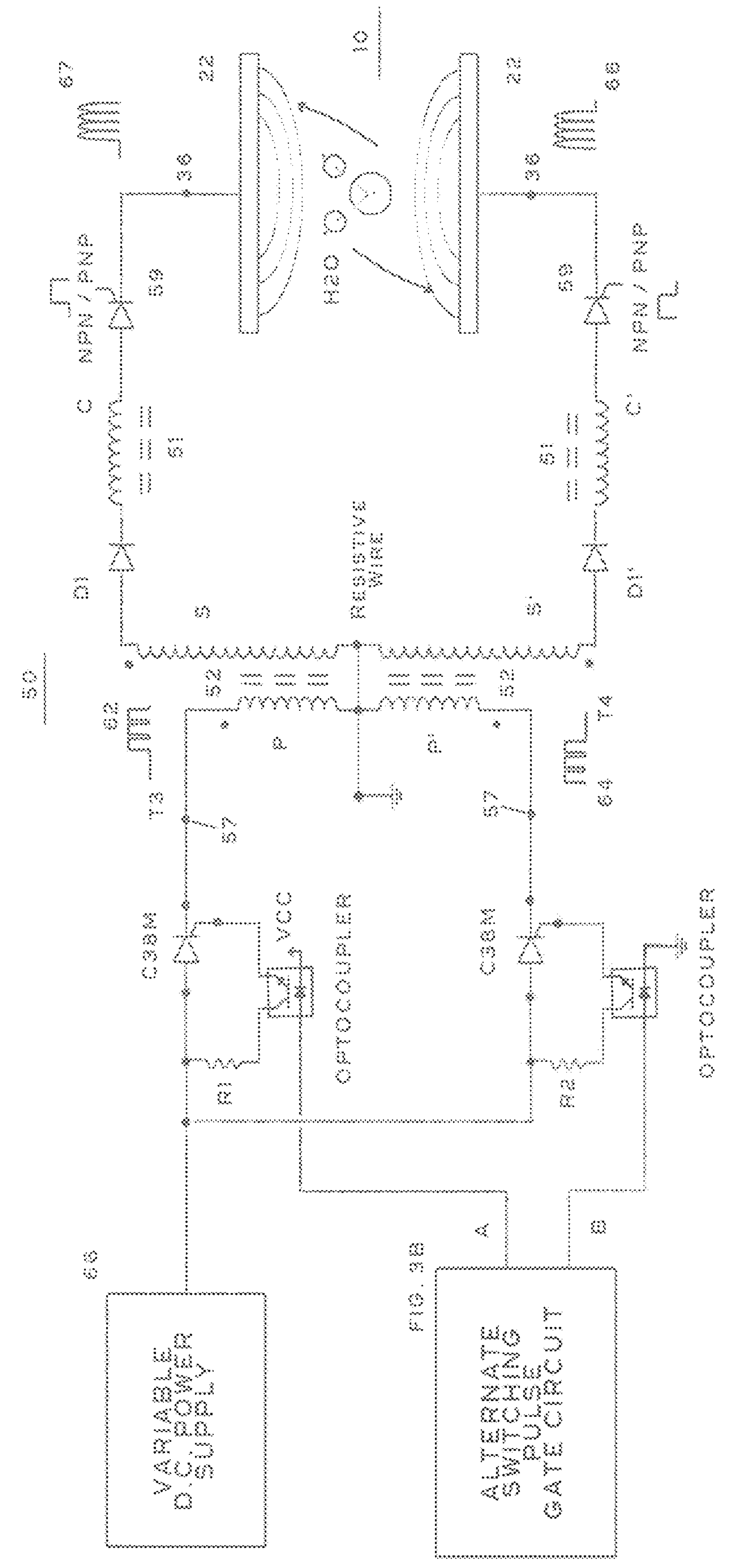
Figure 3E:
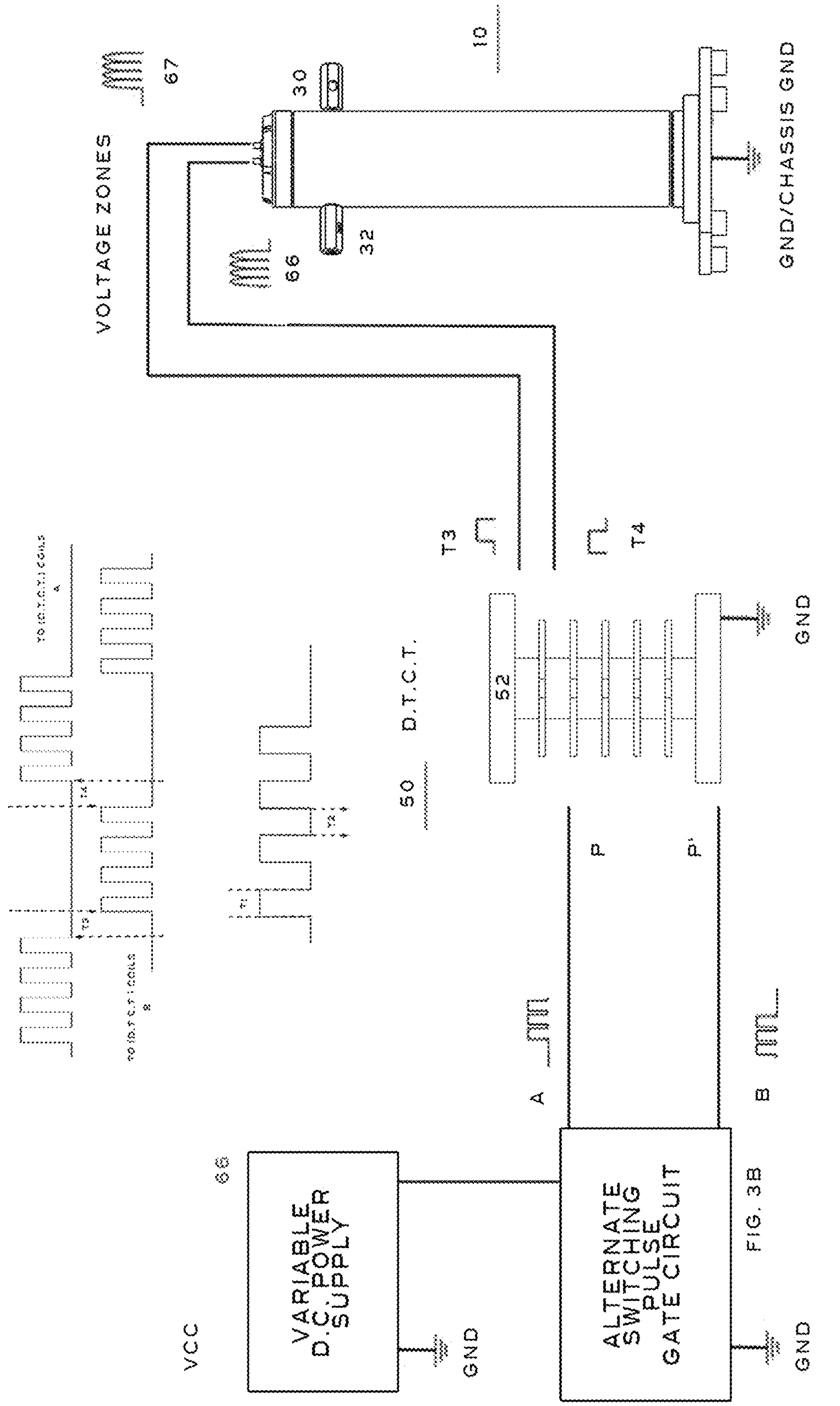
Figure 3F:
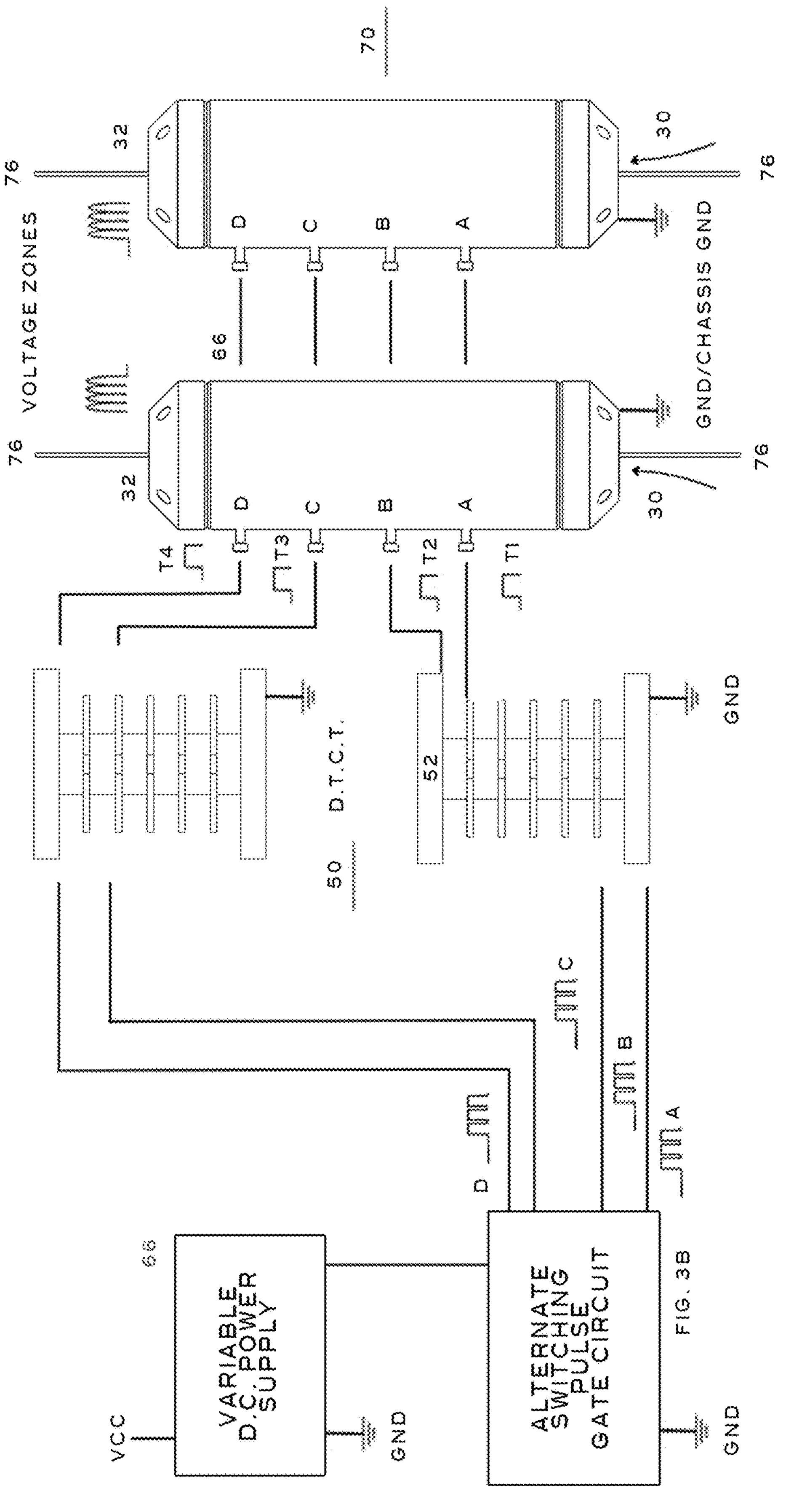
Figure 3G:
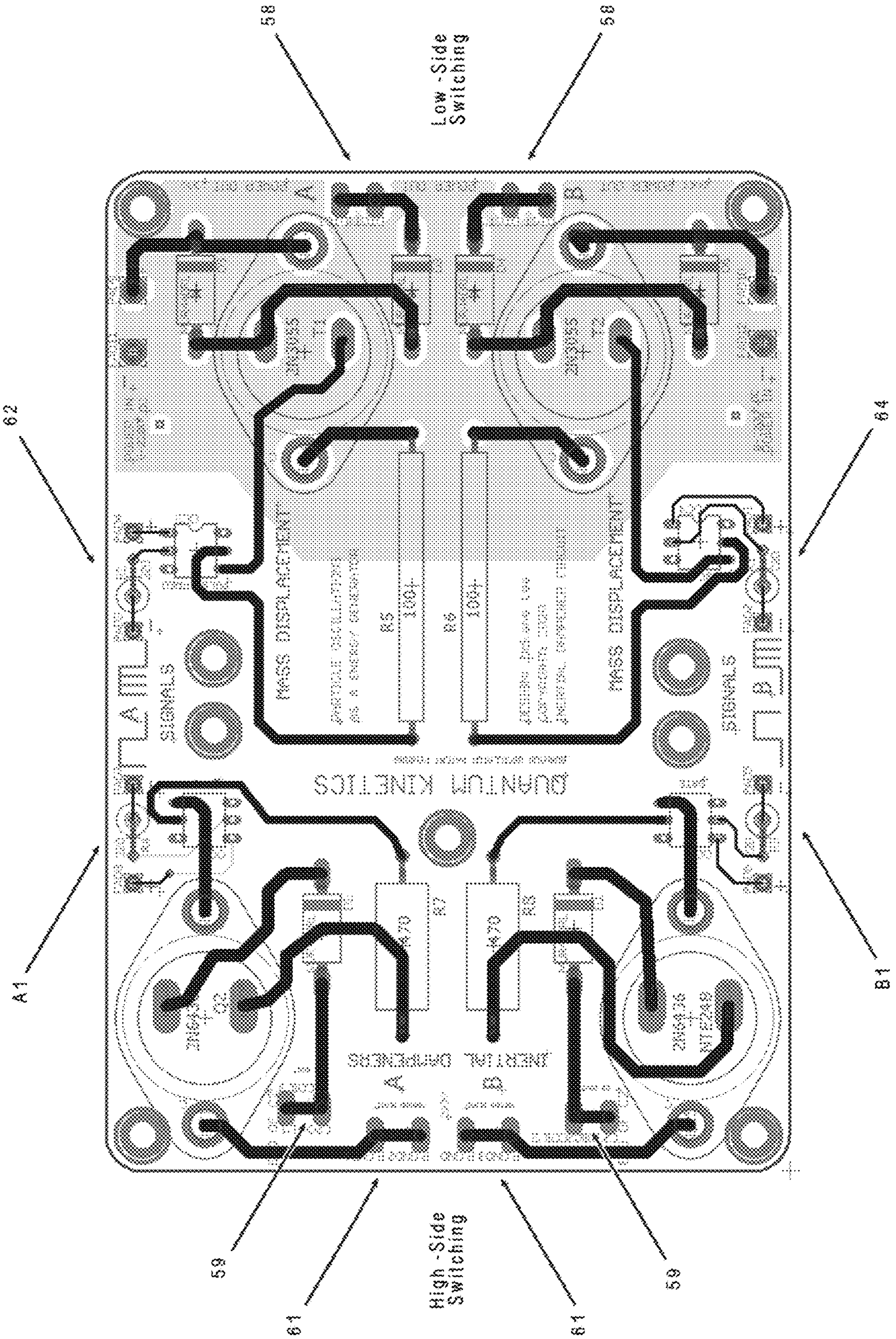

The pulsing network is amplified with power transistors 2N6678 together with, or instead of, power SRCs which are connected to the primary coils P1, P1' of the DTCT 50 through a pulsing schematic, as shown in FIGS. 3B and 3G.

The coils C1, C2, S, S', C2', C1' are preferably formed of resistive wire which retards electron movement. In this manner, drift velocity of electrons through the DTCT 50 is slowed due to the increased magnetic field strength upon migrating electrons in the resistive wire. Further, the innate electron lattice structure of the wire composition also slows the ion movements within the wire. Magnetic copper wire can also be used in the DTCT 50.

FIGS. 3A, 3B, 3C and 3D respectively depict voltage switchover pulse firing logic, and schematics of a pulsing two-state switching circuit and the DTCT 50. FIG. 3A specifically shows square wave voltage pulses having a programmable pulse frequency 60 that drive the coils of the DTCT 50. In particular, an alternating firing sequence of pulses is employed in which a first set of voltage pulses 62 is used to drive one of the tri-coils of the DTCT 50 while a second set of voltage pulses 64 is used to drive the respective other one of the tri-coils of the DTCT 50. The sets 62, 64 are respectively alternating so that the tri-coils are driven out of phase from each other. The voltage pulses have an "on" interval of T1 and an "off" interval of T2. The voltage pulses can have a digital voltage amplitude 66 of a selected value—V0, VA, VB, VC . . . VZ.

These sets of pulses 62, 64 are used to agitate the water molecules in the oscillator 10 and thereby produce superheated steam. Increasing the circuit pulse rate 60 will also further enhance the oscillation vibration (time rate) of the water molecules within the resonant cavity. Delay pulses T3 and T4 between the sets 62, 64 establish a relaxation period within a hysteresis curve of the DTCT 50. Increasing the circuit pulse rate 60 will also further enhance the oscillation vibration (time rate) of the water molecules within the resonant cavity.

As shown in FIG. 3D, electrostatic charges potentials are maintained during resonance with pulses from primary transformers P1, P1' which interact with the secondary coils S, S'. Electromagnetic induction from the primary coils P1, P1' coils to the secondary S, S' coils provides a stop-gap which prevents amp flow between the primary and secondary coils. No electrical junction or connection is made. This process repeats during operation while voltage inputs are attenuated. Since a voltage potential is being subjected to the resonating capacitor electrodes 20, 22, the higher the voltage the higher the electrostatic/electromotive work applied within the cavity.

In FIG. 3C a pair of ultrafast MUR 4100E blocking diodes D1, D1' are connected between the S and the C1 coils (and respectively the S' and C1' coils), which act as a frequency doubling effect on the negative electrode 20 of the resonant cavity. The MUR 4100E diodes D1, D1' act as rectifying modulation diodes to the input frequency to the negative electrode 20 of oscillator resonant cavity. This maintains the pulses to the resonant cavity to be positive in nature. The diodes D1, D1' thus act as half-wave rectifiers to the indicated circuit. However, when the negative electrode 20 (capacitor anode) fully saturates, the rebounding wave from the electrodes 20, 22 interacts with the rebounding wave of the inductor, producing wave interference. This creates an electric "sloshing" in the electro-conductive wire on the anode side of the DTCT 50 which then causes frequency doubling to occur in the DTCT 50. The MUR4100E blocking diodes D1 and D1' prevent electrical shorting from occurring across the secondary coils during said pulsing operations.

Pulse burst wave motion lingers within the DTCT coils C1, C1', C2, C2', Secondary and Secondary'. These oscillating charged ions act like sloshing water in a closed loop bath. With each pulse burst, a wave compounding action is achieved through a wave interference process within and between C1 and the anode of the resonant cavity called "dissonance," the formation of maxima and minima by the superposition of two sets of interference fringes from two different wavelengths. Dissonance is typically associated with music tones but can be analogous to wave vibrations of ions within an RIX circuit, especially since frequency bypass choke coils are involved. This enhancement of wave action is further amplified with bifilar coils as subsequent waves begin to compound on each other during operations.

In FIG. 3B, a 4011 integrated chip establishes the square wave pulse oscillations shown in FIG. 3A at a frequency in a range from 55 Hz-1 MHz. A variable resistor is used to manipulate the duty cycle and gate frequency domain. T1 and T2 time(s) are varied with the 100 K variable resistor. A programmable two-state switching pulse network can be adjusted using variable resistors. Alternatively, microprocessor designs may be utilized in the electronic circuit designs.

Interfaced PNP & NPN junction points between the S, C2 and also the S' and C2' can be pulsed in opposition to give further efficiency of the apparatus. (See FIG. 3G.) The NPN and PNP junction points may also be affixed between the negative electrode 20 (ground) and the positive electrode 22 for additional electro-motive manipulation. This wiring configuration is referred to as the "inertial dampener" circuit. (See FIG. 3G.)

As also shown in FIG. 3B, a 4528 integrated chip is used in the circuit to widen and or shorten the T1 and T2 pulse widths. The pulse delay width can be modified with a 50 K trim pot while the pulse delay time has its own separate 50 K trim pot for attenuating. A 7408 integrated chip blends the signals into a uniform coherent signal. The signal out from the 4528 IC chip is interfaced into pin 1 and 2 of the 7408. This allows for dual toggling between low and then high states for the phototransistors. Phototransistors are interfaced with SCR (C38M) and/or power transistors 2N6678 while connected to the DTCT 50 to establish pulsed DC bursts. High rated power transistors or SCR (600 volts and above) device are required for high voltage pressure inputs to the DTCT 50.

Plasma oscillations are formed on electrodes 20, 22 during primary pulsing of the DTCT 50. Plasma oscillations are influences by phonons, photons, EMF frequencies, voltage amplitude, dielectric constant and geometric shape of the electrodes 20, 22. The established electrostatic lines-of-force within the plasma oscillations extend pass the perimeter of the metallic surface of the electrodes 20, 22, into the dielectric and into/out of the resonant cavity. This is the "skin effect" or "Fermi layer" as shown in FIGS. 4A-4E. The Fermi layer, within metals, gives information regarding the velocity of free electrons, which participate in ordinary electrical conductors, including capacitive plates as well within an electric RLC circuit.

Resonating cavities can be in different shapes and sizes to meet a designed energy need. The oscillator 10 resonant cavities can be spherical, cylindrical, Helmholtz resonators, flat-plate design or any other suitable design. Each design can give a specific energy oscillation density for superheated steam on demand. These plasma oscillation formations can be varied from 1 eV (electron volts) up to and beyond 5,000 eV depending on electrode gap spacing.

Placing insulator material (for example, Delrin) between alternating exciters (electrodes 20, 22) allows voltage potentials to reach higher levels of potential difference. The work function of the exciters is increased due to increased electron clustering that extends past the perimeter of the capacitive metal surface. This increases the mass-to-charge ratio of the Fermi layer. In simple terminology, this phenomenon increases potential difference or charge potentials of the electrodes 20, 22. And adding dielectric insulators between the capacitive plates allows for great potential differences to be achieved. In an exemplary embodiment, the insulator can be 8.125 inches long and 1.82 inches wide.

Figure 4A:
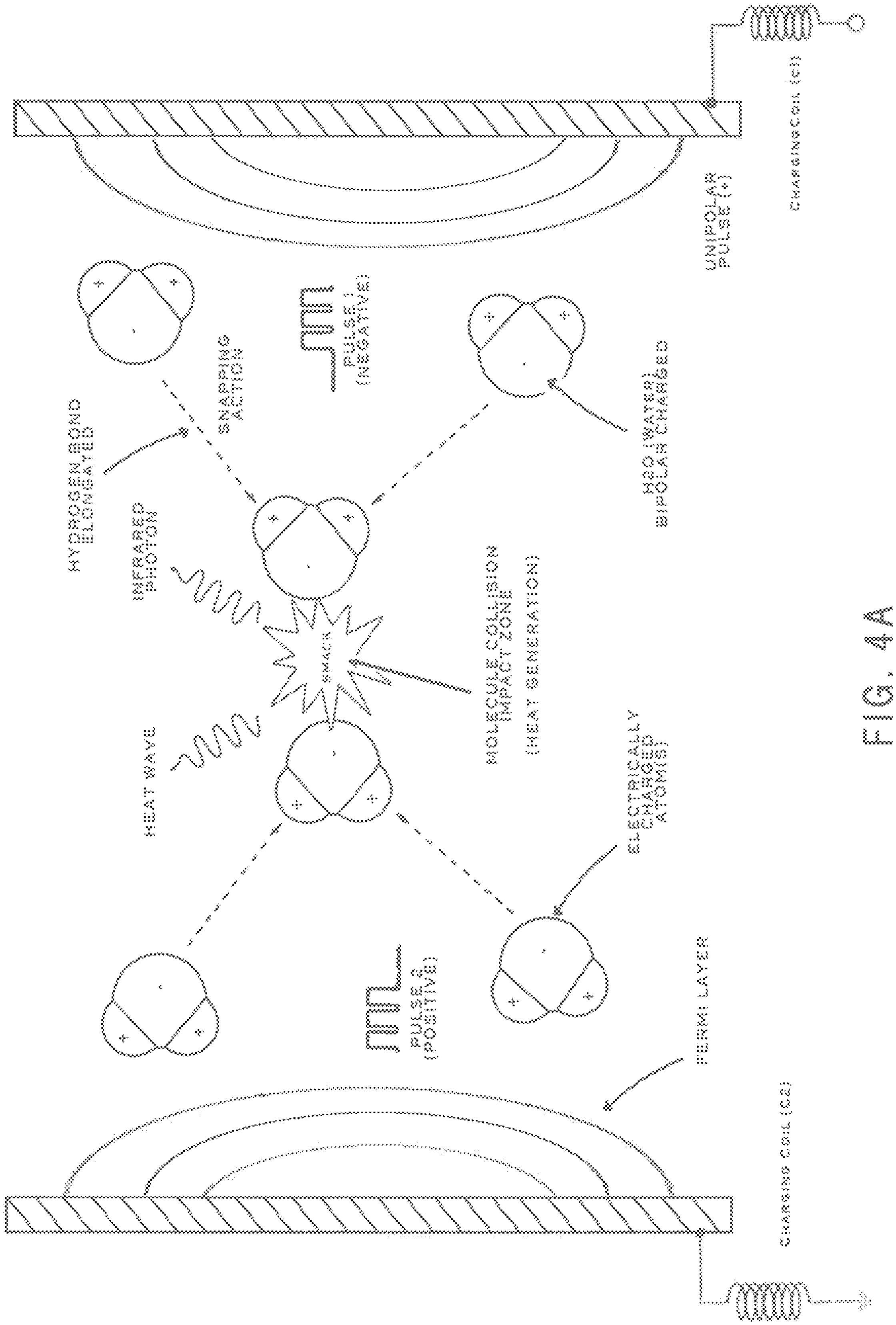
FIGS. 4A, 4B, 4C, 4D and 4E respectively depict various physical reactions between the charging coils of the DTCT according to the present invention.
Figure 4B:
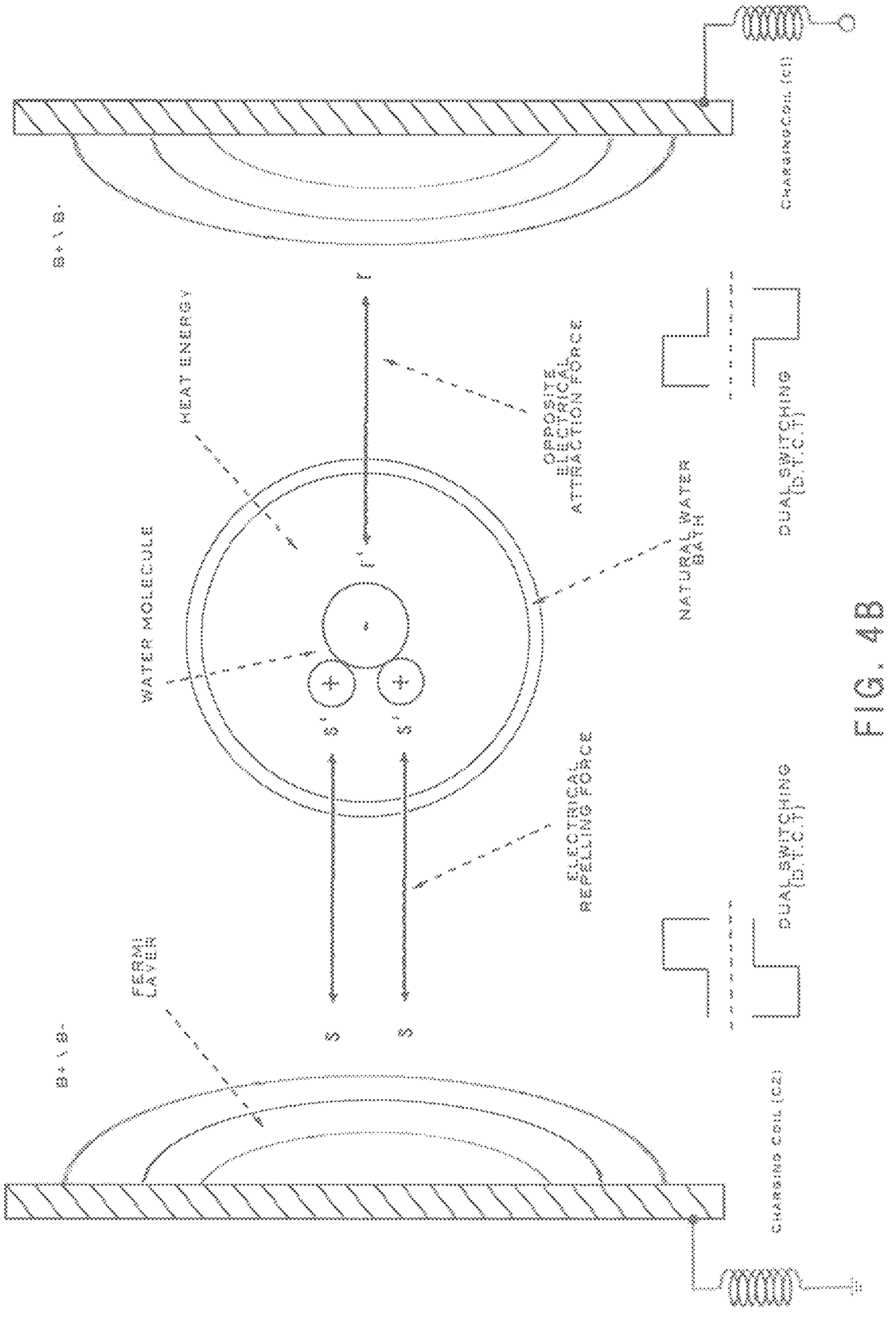

As shown in FIG. 4A, upon successive gated voltage surged pulse alternations, the bipolar water molecules are drawn rapidly between the coils C1 and C2, which produces heated water at a predetermined temperature level on demand. As shown in FIG. 4B, this action also deflects the oscillating bipolar water molecule in an upward direction through the oscillator, displacing water like a pump. The water molecules within the cavity are stimulated using voltage deflection to promote three-dimensional particle mass oscillation vibrations, which ultimately produce heat.

Electron migration is variable and controllable due to the modular inductor coils C1, C2, S. These coils limit DC current by selecting resistance values (in ohms). The choke coils C1, C1' act in like manner to a band-pass filter, amplifier, coupler and selector.

Figure 4C:
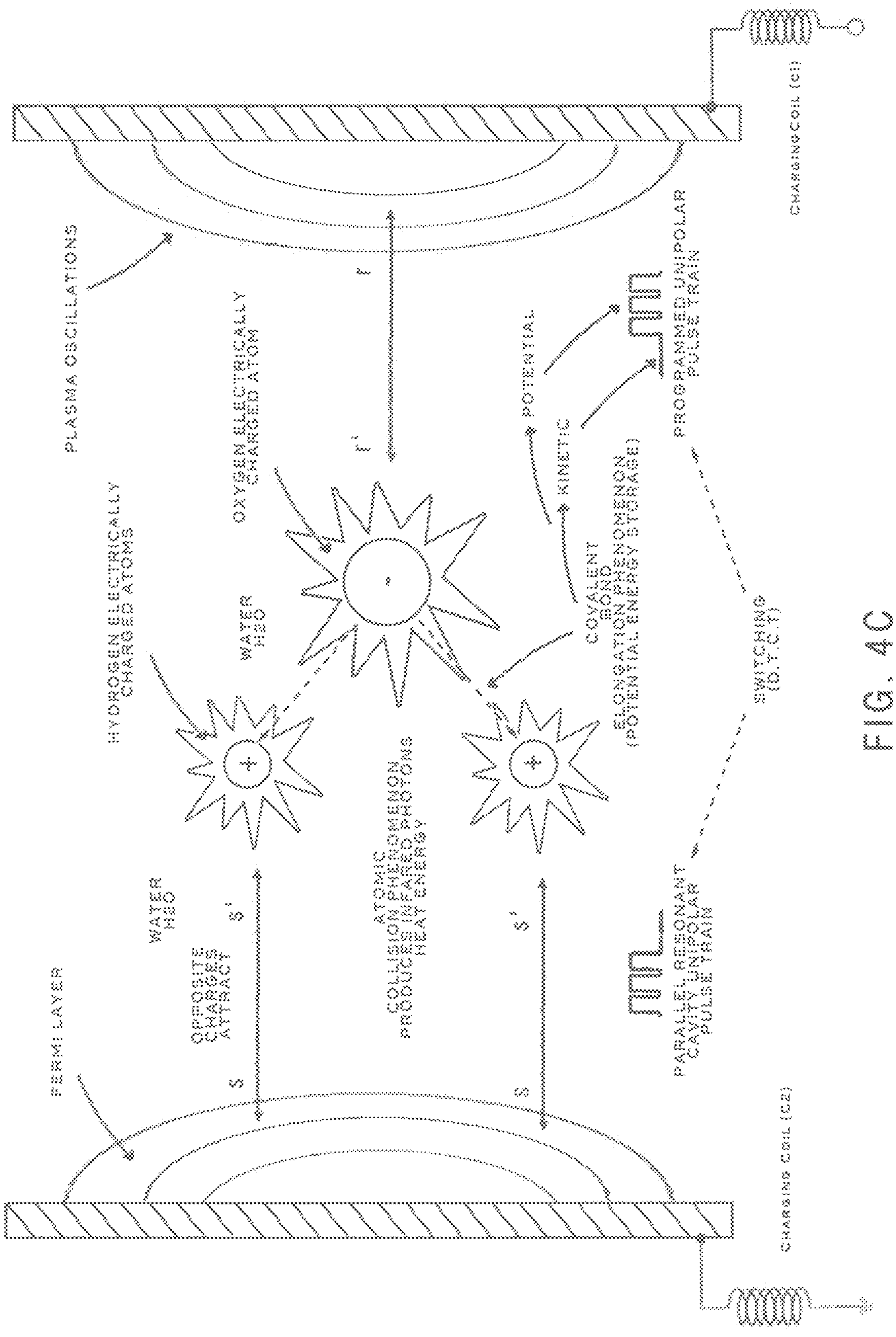

The bifilar coils C1, C2, C1', C2' assist in electron impedance in the network due to crossing electric and magnetic fields. A bifilar wrapped inductor is a winding made non-inductive by winding two wires carrying current in opposite directions together, side by side, as one wire, Voltage intensity is directly determined by the number of turns of each coil in the DTCT 50 as to the applied voltage amplitude of incoming unipolar pulse-wave to primary coils. Voltage corresponds to relative momentum of electron motion within a closed-loop electrical circuit. Voltage intensity as in terms of difference of potential establishes the amount of work performed by the applied "electrical stress"

as shown in FIG. 4C to bring about mass displacement of the water molecule in a liquid form.

The electrodes 20, 22 acting as "exciters" both (+) and (−) increase in charge to mass ratios due to the DTCT 50. A positive unipolar pulse to the DTCT 50 subsequently fabricates a negative plasma oscillation on the negative plate simultaneously. The DTCT 50 acts as the electrical impedance clustering mass to charge ratio amplifier to promote atomic movement via electrostatic charge potential to the "exciters."

Water molecule proximity to the electrodes 20, 22 determines electro-motive flux movement intensity rate(s) or free path length speed. The closer the electrons of the water molecule are to the "exciters" during pulsed operations, the more electromotive attraction or repulsion forces will he applied. The plasma oscillations and field strength is proportional to the radius squared to the "exciters" surface (S and S') as shown in FIG. 4C. Within the water molecule, oxygen atoms are negatively (−) charged while hydrogen atoms are positively (+) charged. This is due to the electron (covalent bond) sharing between the hydrogen and oxygen. By establishing a pulsed positive Fermi layer within the resonant cavity of the oscillator 10, the negatively charged oxygen will migrate toward the positively charged electrode 22 while the positive charged hydrogen will migrate toward the negatively charged electrode 20.

Increasing the voltage of the oscillator 10 will promote greater atomic and subatomic oscillations in the dielectric of water. The energized positive "exciters" or electrodes will cause electron movement in addition to the water molecule (changing the charge to mass ratio i.e. kinetic flexing). The internal energy of the atoms, electrons and sub-atomic particles are stimulated by forced quantum negative differential oscillation pressure effects, that is, the "charged polarization effect" as depicted in FIG. 4C.

Resonant frequencies of natural water vary depending upon the containments within the dielectric. All forms of water will work for this application. Ocean water, rainwater, city water, tap water, melted snow, river water and even distilled water are proper dielectric mediums for this oscillating phenomenon to take place. The natural resonant frequency of water is in the microwave spectrum. The specific wave energy that resonates water is approximately 2.4 gigahertz, a well-known value because all microwave ovens use this frequency to heat food and water. However, the oscillator 10 locks into the dielectric value of water, which is 78.54 ohms, thereby using water as part of the tuned pulsing closed-loop electrical circuit/system.

Though the dielectric value of water is constant, the size and shapes of the "exciters" can vary. Larger electrodes typically have larger resonant frequencies in the KHz-MHz range while smaller electrodes have smaller resonant frequencies in the Hz-KHz range. The present oscillator 10 is therefore a tune-pulsing circuit device that locks into dielectric values such as water, air, vacuum of space and liquid metals. As depicted in FIGS. 4C, the electrical field of water molecules within a volume of water in the "exciters" increases from a low energy state to a high energy state with successive pulses. As shown in FIG. 4B, the increasing voltage potential is always positive in direct relationship to negative ground potential during each pulse.

As shown in FIG. 4C, the pulsed oscillation of the bipolar water molecule in opposite direction of linear travel (back and forth motion) produces kinetic energy within the moving and deflected bipolar water molecule, interacting and colliding with neighboring water molecules. In accordance with FIG. 3A, introducing higher frequency pulse rates further stimulates this process. Once desired pulse rate frequency is established, the voltage amplitude is increased to create production of super-heated gases on demand with little or no amp fluxing.

It is possible to approach zero amp consumption during operational processes if all systems are tuned properly. This effectiveness of the apparatus is established because of the innate electrical conductivity of water, The electrical conductivity of water is at least 1,000,000 times larger than that of most other nonmetallic liquids at room temperature. The current in this case is carried by ions produced by the dissociation of water according to reactions. Thus, the resonant cavity electrical charge interacts with the electrical charging of a single atom (b+ and b−, S'-S and R'-R) of the water molecule (as in FIG. 4C) to produce superheated steam on demand through oscillation charge flexing (as in FIG. 4B).

By simply applying a positive voltage potential across the electrode "exciters," the water molecule is deflected toward the voltage zone due to opposite electrical attraction force between the negative charged oxygen atom of the water molecule and said positive electrical voltage zone. Since like charges repel and thereby produce motion, the accelerated electrically charged molecule collides with other water molecules, producing heat which is absorbed by the surrounding water. An increase of the voltage amplitude to the applied pulse voltage frequency potential of a single polarity promotes higher temperatures and thus steam. Increasing pulse frequency rate further increases steam generation.

The following lists the dielectric internal heat energy per electron-volt potentials at rest due to their relativistic motions:

STAGE 1: (1 eV) Random particle motion of water particles at rest are not truly at rest due to their relativistic motions. Water molecules within a resting vessel actually move about with random quantum kinetic motion.

STAGE 2: (2 eV-32 eV) Alignment of charged particles and soft oscillation movements during pulsing operations—electrostatic charges between 1-32 eVs pushes electrons softly within the vessel (i.e., water molecules). Hydrogen's shared electrons within the "L" orbit of the oxygen atom begin to elongate during this phase of electrostatic burst oscillations. Heating is not yet obtained during this voltage potential but soft particle motion is. This can be seen in FIG. 4B.

STAGE 3: (32 eV-78 eV) Electro-motive hydrogen bond elongation and rebounding "friction" heating action—as the elongation of the hydrogen's electron becomes pulled harder by the alternating pulse bursts, coulomb electron spring tension and "snapping" begins to occur.

Figure 4D:
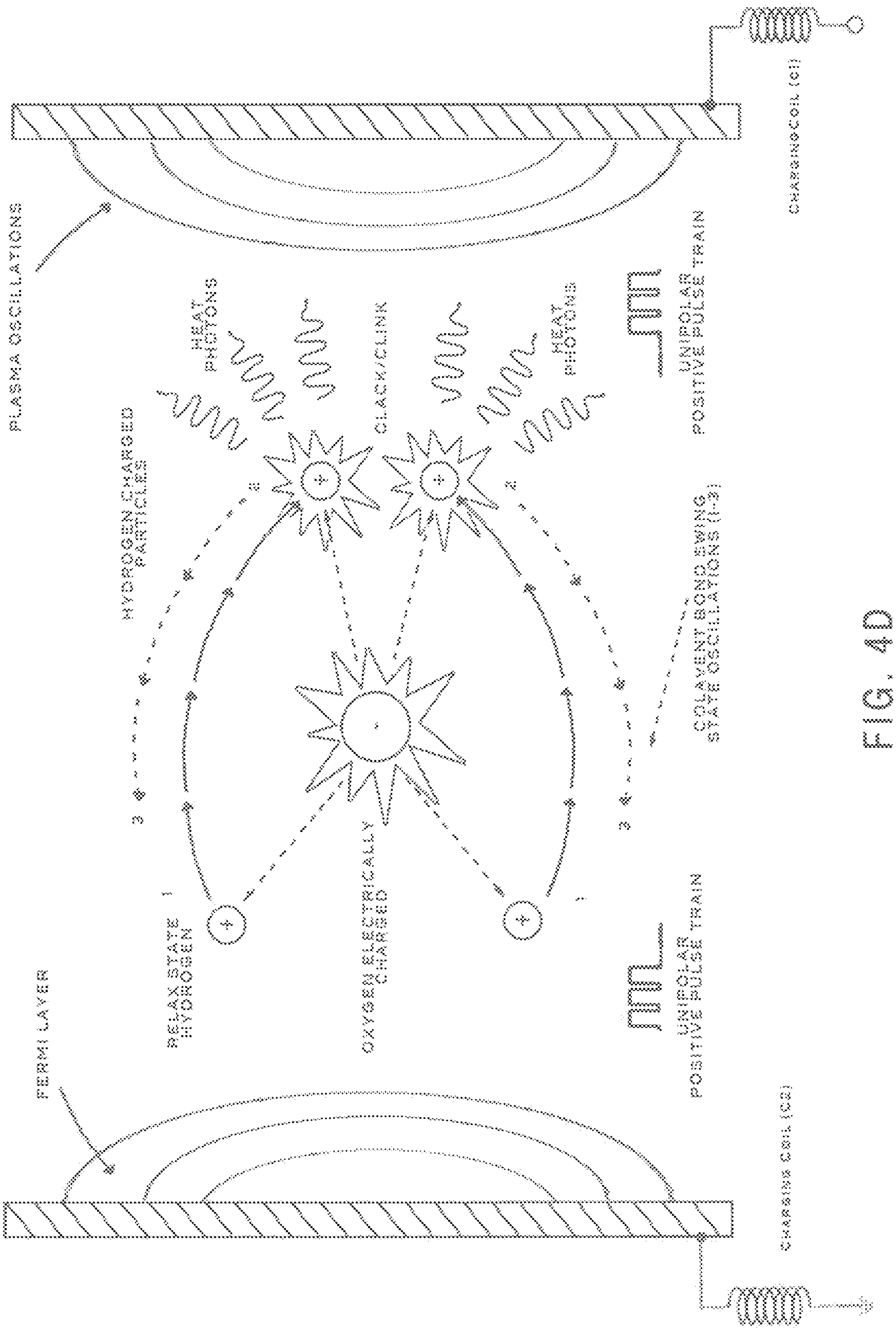
Figure 4E:
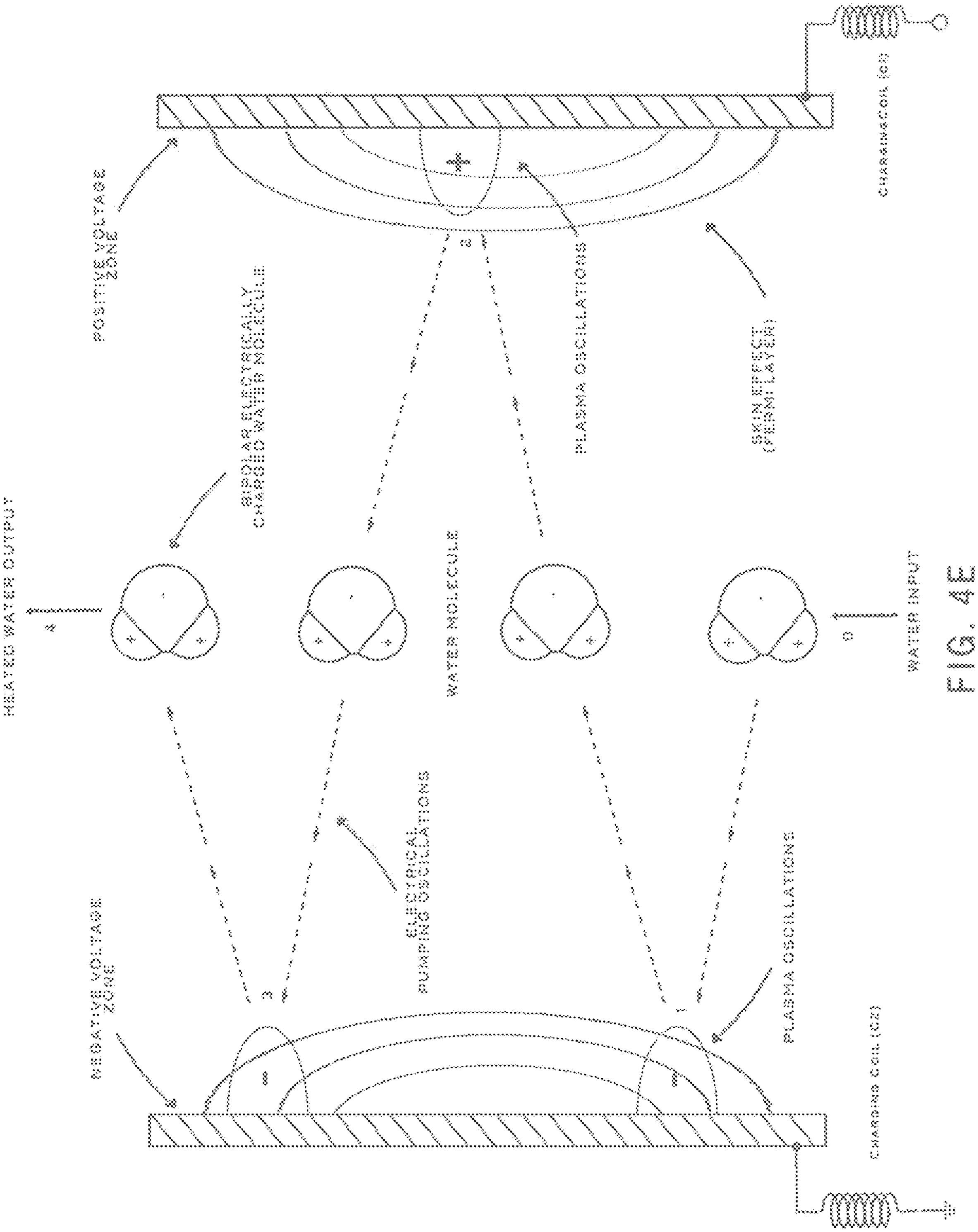

This depiction is seen in FIG. 4D. As the hydrogen atoms and the paired electrons attempt to find stable state during pulsing action, they collide with each other like balls on an oscillating spring. Heating will begin to occur during this phase, but duration times are long. Prevalent "Electron Bremsstrahlung" braking photon emission is also present during this stage.

STAGE 4: (78 eV-120 eV) Physical frictional impacting or water molecule's charged particles increasing temperature—FIG. 4A depicts this process. Entire water molecules begin to collide with inertial forces during unipolar pulsing operations.

STAGE 5: (120 eV-220 eV) Electron collision & frictional resonant oscillations as steam fabrication on demand all elements of the water molecule begin to scatter off each other. Electrons, hydrogen atoms, oxygen atoms and free electrons oscillate violently with enormous inertial mass motion within the cavity during resonant voltage pulse bursts. Particles become further charged and thus migrate toward respective voltage fields with higher velocities. FIGS. 4A, 4B, 4C, 4D and 4E show these behaviors. Electron stabilization begins to take place, which, as these fermions attempt to stabilize, they release photons in the form of infrared energy. Water molecules stay attached as "springs" due to the strong hydrogen covalent bond properties of water.

STAGE 6: (220 eV-2,000 eV) Quantum kinetic oscillations as sub-atomic and atomic nuclei attempt to stabilize—higher energy particles and photon energy are released from the water molecule as the voltages are increased. These further enhance the process and kinetic elastic and inelastic scattering. This can be seen as a cascading effect upon atomic matter as it attempts to find equilibrium. Steam generation is on demand within seconds of operation.

Steam-yield generation is attenuated by using voltage as the electromotive force oscillator. Unipolar voltage influx is increased at resonance to generate more steam on demand.

Resonant frequency ranges from a few Hz to 1 MHz can be achieved with the present resonant cavity transformer. Lower frequencies between 60 Hz-120 Hz may be obtained by using a modified DTCT 50. Frequency ranges can be varied by the construction of the resonant cavity, the size and shape of the electrodes, the diameter of the coils, gauge of wire, resistance (ohm values) of wire, dielectric constant values and relative temperatures. These low frequency ranges also mitigate the use of exotic electrical components. The natural physical-lattice-dimensional harmonic frequencies of resonant frequencies should be matched to the electrical resonant frequencies of the RLC closed-loop circuit. Tuning in to the dielectric medium as part of the RLC circuit allows for operational systems to reach a stable electron flow (impedance) within the closed-loop electrical circuit wiring.

Once resonance has been established within the resonant cavity, electrically charged nuclei and electrons are attracted toward opposite electrically charged Fermi layers as shown in FIG. 4C. This inherently disrupts the mass and charge stabilization of the dielectric material, the bipolar water molecules. The dielectric material begins to oscillate and particle impact thus proceeds within the cavity, thereby producing heat.

The apparatus can operate at a 100V input at a current draw of ~0.02 amps within the selected dielectric once resonance is established. This value can be further optimized using resistive coil wire designs and various bifilar Tesla coil configurations. Voltage values increase uniformly while amp draw is limited to minute levels due to resonance characteristics of the DTCT 50. The input power supply must be universally connected to the interfacing circuits closed-loop circuit design. (See FIG. 3E.) AC to DC rectified voltage supply can vary from 0V-220V for the V0-VZ input 66 to the resonant cavity of the TICT 50 as shown in FIG. 3A.

Utilization of this technology has a wide range including steam piston engines, domestic heating, electrical turbine generation, energy storage, lifting gas applications, sterilization, wood treatment, concrete treatment, cleaning and many industrial applications. The applications of the invention are only limited to the imagination.

Numerous embodiments have been described herein. It will be apparent to those skilled in the art that the above methods and apparatuses may incorporate changes and modifications without departing from the general scope of this invention. it is intended to include all such modifications and alterations in so far as they come within the scope of the appended claims or the equivalents thereof.

Having thus described the invention, it is now claimed:

1. An oscillator apparatus for producing steam, comprising:

a first electrode assembly comprising a first tubular electrode having a first polarity and a first cylindrical electrode haying a second polarity, wherein the first cylindrical electrode is mourned concentrically within the first tubular electrode along a first longitudinal axis;

a second electrode assembly comprising a second tubular electrode having a fist polarity and a second cylindrical electrode having a second polarity, wherein the second cylindrical electrode is mounted concentrically within the second tubular electrode along a second Ion gitudinal axis, a housing for enclosing the first and second electrode assemblies within a volume of water;

at least one exit port hole formed on each of the first and second tubular electrodes to allow superheated steam to exit the first and second tubular electrodes into an interior chamber enclosed by the housing and then into a boiler; and a dual pulsing circuit electrically connected to the first and second electrode assemblies to produce a series of alternating unipolar voltage pulses between the first and second electrode assemblies in a sequential manner to create a switching electrostatic flux field, wherein the first and second electrode assemblies define a dual resonant cavity that utilizes the switching electrostatic flux field to rapidly oscillate water molecules and thereby produced superheated steam.

2. The oscillator of claim 1, wherein the first and second tubular electrodes are electrically positive "exciter" electrodes and the first and second cylindrical electrodes are electrically negative electrodes.

3. The oscillator of claim 2, wherein the dual pulsing circuit is configured to produce a series of alternating unipolar positive voltage pulses between the positive "exciter" electrodes of the first and second electrode assemblies.

4. The oscillator of claim 1, wherein the first and second electrode assemblies further comprise terminals for electrically connecting to the dual raising circuit.

5. The oscillator of claim 1, further comprising a top cap for enclosing a top of the housing and a base plate for enclosing a bottom of the housing.

6. The oscillator of claim 1, further comprising a series of aligned electrodes, each for applying an electromotive thrust to charged water molecules from the housing.

7. The oscillator of claim 6, wherein the aligned electrodes are all charged with the same electric charge.

8. The oscillator of claim 6, wherein the aligned electrodes are tapered in a direction of movement of the charged water molecules.

9. The oscillator of claim 6, wherein the water thruster nozzle aligned electrodes comprise a central channel for receiving a geometrically centered laser beam for inducing plasma channeling in the charged water molecules.

10. The oscillator of claim 1, thither comprising a Dual Tri-Coil Transformer (DTCT) linked to the dual pulsing circuit that alternates the unipolar positive voltage pulses from one of a positive electrode of the first and second electrode assemblies to another.

* * * * *